United States Patent
Zhong et al.

(10) Patent No.: US 12,008,779 B2
(45) Date of Patent: Jun. 11, 2024

(54) DISPARITY ESTIMATION OPTIMIZATION METHOD BASED ON UPSAMPLING AND EXACT REMATCHING

(71) Applicants: DALIAN UNIVERSITY OF TECHNOLOGY, Liaoning (CN); PENG CHENG LABORATORY, Guangdong (CN)

(72) Inventors: Wei Zhong, Liaoning (CN); Hong Zhang, Liaoning (CN); Haojie Li, Liaoning (CN); Zhihui Wang, Liaoning (CN); Risheng Liu, Liaoning (CN); Xin Fan, Liaoning (CN); Zhongxuan Luo, Liaoning (CN); Shengquan Li, Liaoning (CN)

(73) Assignees: DALIAN UNIVERSITY OF TECHNOLOGY, Liaoning (CN); PENG CHENG LABORATORY, Guangdong (CN)

( * ) Notice: Subject to any disclaimer, the term of this patent is extended or adjusted under 35 U.S.C. 154(b) by 409 days.

(21) Appl. No.: 17/604,588

(22) PCT Filed: Mar. 5, 2020

(86) PCT No.: PCT/CN2020/077961
§ 371 (c)(1),
(2) Date: Oct. 18, 2021

(87) PCT Pub. No.: WO2021/138992
PCT Pub. Date: Jul. 15, 2021

(65) Prior Publication Data
US 2022/0198694 A1    Jun. 23, 2022

(30) Foreign Application Priority Data

Jan. 10, 2020    (CN) .......................... 202010028308.2

(51) Int. Cl.
*G06T 7/593*    (2017.01)
*G06T 3/4076*    (2024.01)
(Continued)

(52) U.S. Cl.
CPC ............ *G06T 7/593* (2017.01); *G06T 3/4076* (2013.01); *G06V 10/40* (2022.01); *G06V 10/443* (2022.01); *G06T 2207/20084* (2013.01)

(58) Field of Classification Search
CPC .................. G06T 7/593; G06T 3/4076; G06T 2207/20084; G06V 10/443; G06V 10/40
See application file for complete search history.

(56) References Cited

U.S. PATENT DOCUMENTS

2011/0176722 A1*    7/2011    Sizintsev .................. G06T 7/97
382/154

FOREIGN PATENT DOCUMENTS

| CN | 110427968 A | * | 11/2019 | ........... G06K 9/6201 |
| CN | 110533712 A | * | 12/2019 | ............ G06T 7/593 |

(Continued)

OTHER PUBLICATIONS

M. Yao and B. Xu, "A Dense Stereovision System for 3D Body Imaging, "2019, in IEEE Access, vol. 7, pp. 170907-170918, doi: 10.1109/ACCESS.2019.2955915. (Year: 2019).*

(Continued)

*Primary Examiner* — Vu Le
*Assistant Examiner* — Jack Peter Kraynak
(74) *Attorney, Agent, or Firm* — Muncy, Geissler, Olds & Lowe, P.C.

(57) ABSTRACT

The present invention discloses a disparity estimation optimization method based on upsampling and exact rematching, which conducts exact rematching within a small range in an optimized network, improves previous upsampling methods such as neighbor interpolation and bilinear inter- (Continued)

polation for disparity maps or cost maps, and works out a propagation-based upsampling method by the way of network so that accurate disparity values can be better restored from disparity maps in the upsampling process.

3 Claims, 3 Drawing Sheets

(51) Int. Cl.
    *G06V 10/40*     (2022.01)
    *G06V 10/44*     (2022.01)

(56) References Cited

FOREIGN PATENT DOCUMENTS

KR     20210025942 A  *  3/2021
KR       102487270 B1  *  1/2023

OTHER PUBLICATIONS

S. Jammal, T. Tillo and J. Xiao, "Multi-resolution for disparity estimation with convolutional neural networks," 2017 Asia-Pacific Signal and Information Processing Association Annual Summit and Conference (APSIPA ASC), Kuala Lumpur, Malaysia, 2017, pp. 1756-1761, doi: 10.1109/APSIPA.2017.8282317. (Year: 2017).*

* cited by examiner

DISPARITY ESTIMATION OPTIMIZATION METHOD BASED ON UPSAMPLING AND EXACT REMATCHING

TECHNICAL FIELD

The present invention belongs to the field of image processing and computer vision, relates to a binocular disparity estimation method based on supervised learning from coarse to fine, and particularly relates to a disparity estimation optimization method based on upsampling and exact rematching.

BACKGROUND

Binocular depth estimation is to obtain a corresponding disparity value through two calibrated left and right views according to the relative position of each pixel among different views and restore the disparity to the depth information of an image according to a camera imaging model. The existing binocular depth estimation methods are mainly divided into traditional methods and deep learning methods.

The traditional methods are divided into a local algorithm and a global algorithm. The local algorithm is to use the similarity of neighboring pixels in the window for matching. The global method is to construct an energy function, including the matching cost of the pixel point and the constraint relation between different pixel points, and obtain a final disparity map by minimizing the energy function. The traditional methods have long running time and low precision, especially high error of false matching in non-texture and shielding areas.

The deep learning methods are to work out the disparity map of left and right views through end-to-end learning via the neural network, and the basic framework mainly comprises feature extraction, cost map establishment, disparity aggregation and disparity optimization. The left and right views are input into the network, and left and right feature maps are obtained through a feature extraction network and matched under different disparities to obtain a cost map with low resolution. The aggregation and optimization part is divided into two methods: the first is to optimize the cost map with low resolution, restore to the original resolution step by step, and finally work out a disparity map through soft argmin; and the second is to obtain a disparity map with low resolution from the cost map with low resolution and upsample and optimize the disparity map step by step to obtain a final disparity map with original resolution. To meet the requirements of network calculation and speed, it is often necessary to match on the feature map with low resolution, which leads to loss of small objects in the downsampling process. In the subsequent optimization module, the problem of loss of small objects is not taken into account, and no priori is introduced by supervising regeneration of small objects, which results in lack of details and poor generalization capability of the network. The upsampling methods adopted at present are mostly based on neighbor interpolation, bilinear interpolation and trilinear interpolation, and such interpolation methods do not conform to distribution of the disparity map, which will cause inconsistence of the disparity of objects directly facing the imaging plane and also destroy the discontinuity of the disparity at the edges of the objects.

The present invention provides an exact rematching method from coarse to fine, which reintroduces geometric constraint in the process of disparity optimization and improves the generalization capability of the network by using a disparity map and left and right views at low resolution, conducting matching once within a small range of disparity and making the range of the disparity map accurate. Meanwhile, the present invention provides a propagation-based upsampling method. The left feature map with the corresponding resolution is used to work out the relative relation weight of each pixel and a neighboring pixel, and the confidence and the weight obtained according to the left and right reestablishment consistency are propagated on the upsampled disparity map so that the context information can be better combined in the upsampling process of the disparity map to reduce error filling caused by interpolation and upsampling.

SUMMARY

The present invention aims to overcome the defects of the existing deep learning methods and provides a disparity estimation optimization method based on upsampling and exact rematching, which conducts exact rematching within a small range in an optimized network, improves previous upsampling methods such as neighbor interpolation and bilinear interpolation for disparity maps or cost maps, and works out a propagation-based upsampling method by the way of network so that accurate disparity values can be better restored from disparity maps in the upsampling process.

The specific solution comprises the following steps:

A disparity estimation optimization method based on upsampling and exact rematching, comprises the following steps:

Step 1: extracting discriminable features;
Step 2: conducting initial cost matching and cost map optimization to obtain an initial disparity map with low resolution;
Step 3: obtaining a disparity map with one resolution higher from the initial disparity map with low resolution by a propagation upsampling method and an exact rematching method, and repeating the process until the original resolution is restored;

3.1 The Propagation Upsampling Method

The initial disparity map $D_{n+1}$ with minimum resolution is first subjected to interpolation and upsampling to obtain a coarsely matched disparity map $D'_n$, the disparity map obtained at this moment is only obtained by numerical interpolation without reference to any structural information of an original image, a left view is reestablished with an original right view $I_r$ according to the coarsely matched disparity map $D'_n$ and denoted as $\tilde{I}_l$, and then the error between the reestablished left view $\tilde{I}_l$ and a real left view $I_l$ is calculated to obtain a confidence map $M_c$:

$$M_c = 1 - \text{normalization}(I_l - \tilde{I}_l) \tag{2}$$

normalization(•) is normalized operation, the difference is normalized to (0,1), and the probability value at each point on the confidence map $M_c$ represents the confidence of the disparity value of the pixel; and the confidence map is reproduced and translated to become a confidence map group which is denoted as $M_{cg}$, $$M_{cg} = f_c(M_c, k, s) \tag{3}$$

wherein $f_c(\bullet)$ represents the operation of reproduction and translation to resize, k represents the size of a neighboring window, and s represents the void content of a sampling window, and the receptive field is $(2s+1)^2$, and a confidence vector of k*k is obtained at each position, which represents the confidence of a pixel in a k*k neighboring window around the pixel;

A relative relation network module is proposed, a left feature map with the corresponding resolution is input into the module, and a weight vector is worked out at each position, which indicates the relative relation of the neighboring pixel and the center pixel, i.e., the larger the weight is, the greater the effect of a neighboring pixel on the pixel is; and the weight is donated as $W_{relative}$;

$$W_{relative} = \vartheta_{relative}(F_n^l, k) \quad (4)$$

wherein k represents the size of a neighboring window, and $\vartheta_{relative}$ represents the relative relation network module:

The coarsely matched disparity map $D'_n$, the confidence map $M_{cg}$ and the relative relation weight $W_{relative}$ are used for propagation to obtain a propagated disparity map, and the propagation calculation process is as follows:

$$D_n^P = \langle f_c(D'_n, k, s), \text{softmax}(W_{relative} * M_{cg}) \rangle \quad (5)$$

wherein $D_n^P$ represents the propagated disparity map, $\langle , \rangle$ represents dot product operation, $f_c(\bullet)$ represents the operation of reproduction and translation to resize, and softmax ($W_{relative} * M_{cg}$) represents the support strength of the surrounding pixel to the center pixel during propagation and is obtained by multiplying the confidence of the surrounding pixel and the relative relation weight;

Then the void content of the window is used for repeating the propagation process so that the optimized disparity map can be propagated in different receptive fields- and at this point, the propagation upsampling process from $D_{n+1}$ to $D_n^P$ is completed:

3.2 The Exact Rematching Method

First, a left feature map is reestablished with a right feature map $F_n^r$ with the corresponding resolution in a feature list $\mathcal{L}$ according to $D_n^P$ and donated as $\widetilde{F_n^l}$, and $\widetilde{F_n^l} = f_w(F_n^r, D_n^P)$; and rematching is conducted once with the reestablished left feature map $\widetilde{F_n^l}$ and the original left feature map $F_n^l$ within a small range of the disparity $d=[-d_0, d_0]$ to obtain a cost map, then the cost map is optimized through an hourglass network, the disparity is regressed to obtain a bias map $\Delta$ which represents an offset from $D_n^P$, and the two maps are added to obtain a final disparity map $D_n$ of an optimized network;

$$D_n = D_n^P + \Delta \quad (6)$$

the processes of 3.1 and 3.2 are iterated repeatedly until the original resolution is restored to obtain a final high-precision disparity map.

The present invention has the following beneficial effects:

1) The present invention provides an exact rematching method from coarse to fine, which reintroduces geometric constraint in the process of disparity optimization and improves the generalization capability of the network by using a disparity map and left and right views at low resolution, conducting matching once within a small range of disparity and making the range of the disparity map accurate.

2) The present invention proposes a method for propagation upsampling using context, which conducts upsampling by combining the context and the current coarse disparity confidence in the process of disparity optimization, solves the problem of edge destruction in the current upsampling methods and can obtain a disparity map with finer edge and higher resolution.

DETAILED DESCRIPTION

Figure 1:
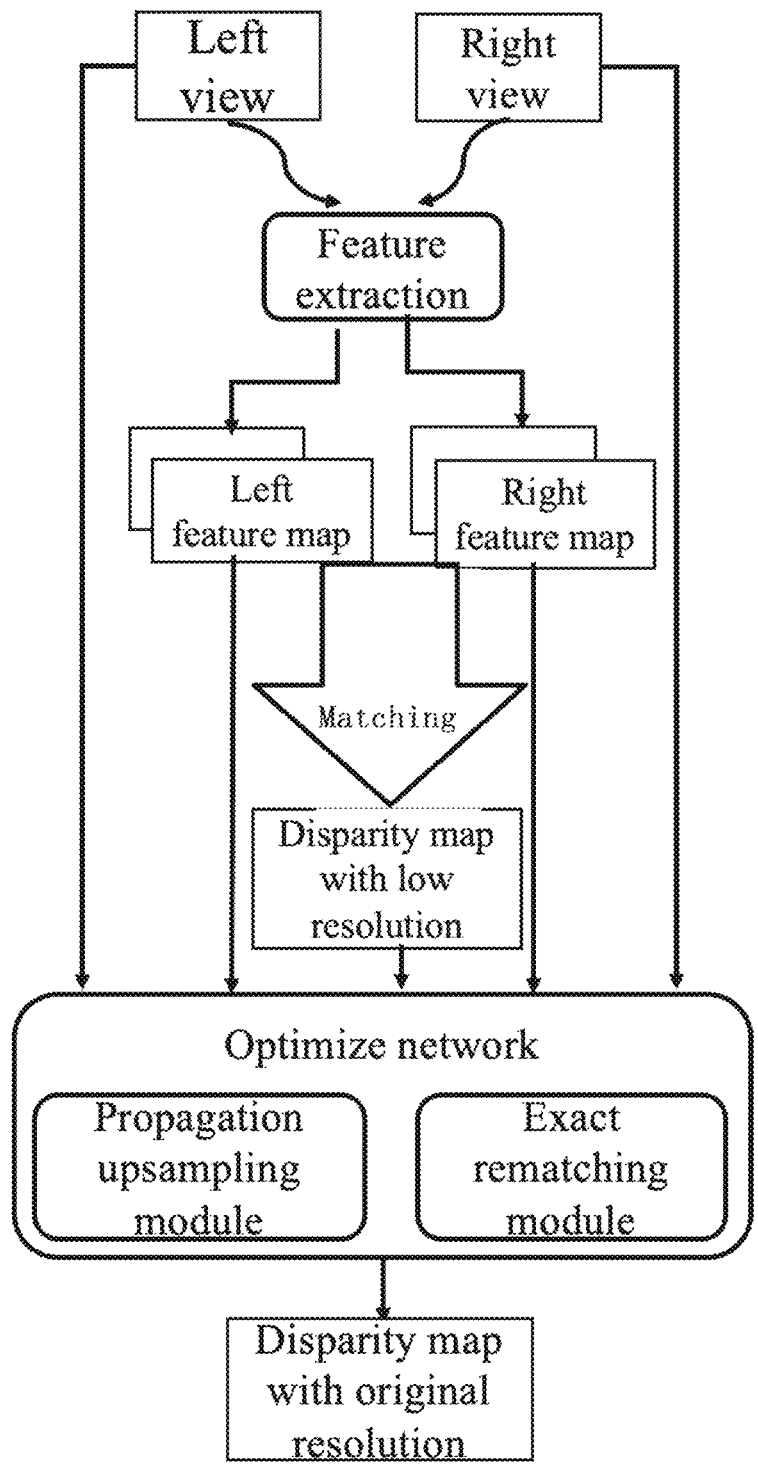
FIG. 1 is an overall flow chart of a solution.

The present invention makes end-to-end disparity map prediction on the input left and right views based on the disparity optimization strategy of a disparity estimation framework from coarse to fine, and the specific solution of predicting an accurate disparity map by the propagation upsampling method and the exact rematching method proposed by the present application without introducing additional tasks is as follows:

The specific flow of the network of the solution is shown in FIG. 1, and the specific operation is as follows:

Step 1: extracting discriminable features;

The features of the left and right views input into the network are extracted. Compared with matching in the gray value of the original image, matching using a feature vector can better cope with the change of illumination and appearance, and the extracted feature vector can provide more detailed and complete description of the information of the image, which is conductive to better matching. Feature extraction using a simple CNN network comprises four cascaded parts (each part comprises three different convolution layers to extract features), the four parts respectively generate left and right feature maps $F_0$ to $F_3$ with different resolutions (a subscript represents a downsampling factor, for example, $F_3$ represents a feature map with ⅛ resolution), the dimension of each feature vector f is 32, four feature maps with different resolutions are stored in the feature list $\mathcal{L} = \{F_0, F_1, F_2, F_3\}$ as the input of the subsequent optimized network, and then matching is conducted on the feature map $F_3$ with minimum resolution, i.e., ⅛ resolution.

Step 2: conducting initial cost matching and cost map optimization to obtain an initial disparity map with low resolution;

$F_3^l$ and $F_3^r$ represent left and right feature maps with ⅛ resolution, $f^l(x, y)$ $f^r(x, y)$ represents the feature vector at one point on the image, and C represents a cost map, wherein the formula for forming the cost map is as follows: (formula 1)

$$C(x, y, d) = \langle f^l(x, y) - f^r(x-d, y) \rangle \quad (1)$$

$\langle \rangle$ represents the subtraction of the corresponding position elements of the feature vector, d is equal to $\{0, 1, 2, D_{max}\}$, and $D_{max}$ is the maximum disparity during matching, so the size of the cost map finally formed is $[H/8, W/8, D_{max}/8, f]$.

A cost map with ⅛ resolution is obtained and then optimized through an hourglass network, wherein the hourglass network is composed of convolution layers with different step sizes, and a cost map output from the hourglass network is regressed by the soft argmin layer to obtain a coarse disparity map with ⅛ resolution, which is donated as $D_3$.

Step 3: inputting the initial disparity map with low resolution into the optimized network to obtain a fine disparity map with high resolution;

A disparity map with one resolution higher is obtained from the disparity map with minimum resolution by a propagation upsampling module and an exact rematching module, and the process is repeated until the original resolution is restored.

Figure 2:
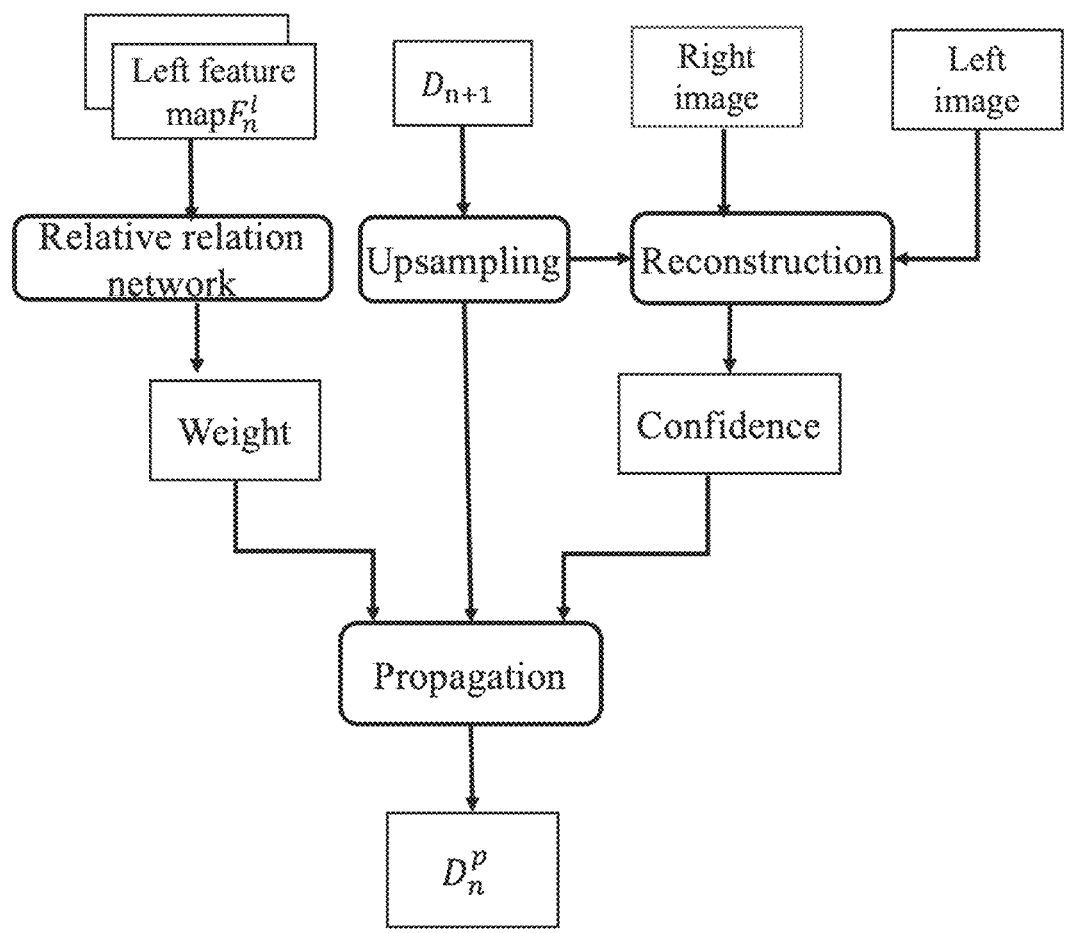
FIG. 2 is a flow chart of a propagation upsampling module.
Figure 3:
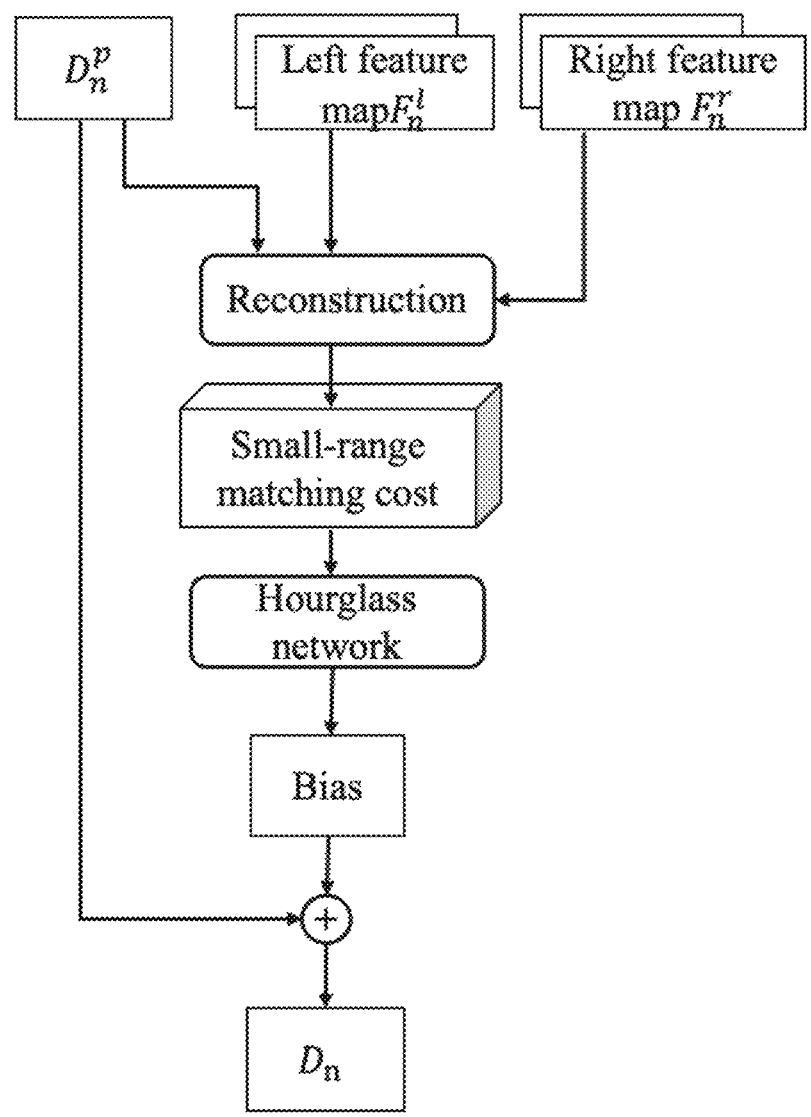
FIG. 3 is a flow chart of exact rematching.

The specific flow is shown in FIG. 2 and FIG. 3.

The specific steps are as follows. (with one-step iteration from $D_3$ to $D_2$ as an example)

3.1 Propagation Upsampling Method $D_3$ is first subjected to interpolation and upsampling to obtain a coarsely matched disparity map $D'_2$, the disparity map obtained at this moment is only obtained by numerical interpolation without reference to any structural information of an original image, and information loss caused by downsampling cannot be restored, so the obtained $D'_2$ has a higher error rate. Therefore, a propagation-based strategy is required to optimize the disparity map $D'_2$. A left view is reestablished with an original right view $1_r$ according to the upsampling disparity map $D'_2$ and denoted as $\tilde{I}_l$, and $\tilde{I}_l = f_w(I_r, D_n)$. $f_w(\bullet)$ is a warping function. Then the error between the reestablished left view $\tilde{I}_l$ and a real left view $I_l$ is calculated to obtain a confidence map $M_c$:

$$M_c = 1 - \text{normalization}(I_l - \tilde{I}_l) \quad (2)$$

normalization($\bullet$) is normalized operation, the difference is normalized to (0,1), and the probability value at each point on the confidence map $M_c$ represents the confidence of the disparity value of the pixel. The confidence map is reproduced and translated to become a confidence map group with the size of [H/8, W/8, k*k], which is denoted as $M_{cg}$, $$M_{cg} = f_c(M_c, k, s) \quad (3)$$

wherein $f_c(\bullet)$ represents the operation of reproduction and translation to resize, k represents the size of a neighboring window, and s represents the void content of a sampling window. (The receptive field is $(2s+1)^2$) A confidence vector of k*k can be obtained at each position, which represents the confidence of a pixel in a k*k neighboring window around the pixel.

A relative relation network module is proposed, a left feature map with the corresponding resolution is input into the module, and a weight vector is worked out at each position, which indicates the relative relation of the neighboring pixel and the center pixel, i.e., the larger the weight is, the greater the effect of a neighboring pixel on the pixel is. For example, if the relative relation between the pixel and a neighboring pixel in the same object is strong, the weight is also large, and on the contrary, if the neighboring pixel is at the edge, the weight of the pixel is small. Through this module, different weights can be worked out from each image so that the disparity value of the pixel can be updated according to different weights of the surrounding pixel during propagation rather than that the disparity map is optimized using the convolution kernel with the same weight for different inputs in the conventional neural networks. The module is composed of three convolution layers with void contents of {1,2,3}, the left feature map is input, and the weight with the size of [H/8, W/8, k*k] is output and donated as $W_{relative}$;

$$W_{relative} = \vartheta_{relative}(F_n^l, k) \quad (4)$$

wherein k represents the size of a neighboring window, and $\vartheta_{relative}$ represents the relative relation network module.

The coarse disparity map $D'_2$, the confidence map $M_{cg}$ and the relative relation weight $W_{relative}$ obtained in the above step of upsampling are used for propagation to obtain an optimized $D_2^P$ (p: propagate), and the propagation calculation process is as follows:

$$D_n^P = \langle f_c(D'_n, k, s), \text{softmax}(W_{relative} * M_{cg}) \rangle \quad (5)$$

wherein $D_n^P$ represents the propagated disparity map, $\langle, \rangle$ represents dot product operation, $f_c(\bullet)$ represents the operation of reproduction and translation to resize, and softmax $(W_{relative} * M_{cg})$ represents the support strength of the surrounding pixel to the center pixel during propagation and is obtained by multiplying the confidence of the surrounding pixel and the relative relation weight. Then the void content s=1, 2, 3 of the window is used for repeating the propagation process three times so that the optimized disparity map can be propagated in different receptive fields. At this point, the propagation upsampling process from $D_{n+1}$ to $D_n^P$ is completed.

3.2 Exact Rematching Method

The propagation upsampling module outputs a propagation-based disparity map $D_n^P$ with high resolution from $D_{n+1}$ with low resolution, and the exact rematching module will conduct rematching within a small range on $D_n^P$. First, a left feature map is reestablished with a right feature map $F_n^r$ with the corresponding resolution in a feature list $\mathcal{L}$ according to $D_n^P$ and donated as $\widetilde{F}_n^l$, and $\widetilde{F}_n^l = f_w(F_n^r, D_n^P)$. Rematching is conducted once with the reestablished left feature map $\widetilde{F}_n^l$ and the original left feature map $F_n^l$ within a small range of the disparity d=[-2, 2] to obtain a cost map with the size of [H/4, W/4, 5, f] (with $D_2^P$ as an example), then the cost map is optimized through an hourglass network, the disparity is regressed to obtain a bias map $\Delta$ which represents an offset from $D_n^P$, and the two maps are added to obtain a final disparity map $D_n$ of an optimized network.

$$D_n = D_n^P + \Delta \quad (6)$$

The processes of 3.1 and 3.2 are iterated repeatedly until the original resolution is restored to obtain a final high-precision disparity map.

4. Loss Function

The solution adopts two kinds of loss functions for network training, the smooth loss function is used for the disparity map $D_n^P$ output by the propagation upsampling module and donated as $\mathcal{L}_{smooth}$, and the output of the exact rematching module is supervised through downsampling to the disparity label with the corresponding resolution and donated as $\mathcal{L}_{gt}$, $$\mathcal{L}_{smooth} = \frac{1}{N} \sum_{i,j} |\partial_x d_{i,j}| e^{-|\partial_x \varepsilon_{i,j}|} + |\partial_y d_{i,j}| e^{-|\partial_y \varepsilon_{i,j}|} \quad (7)$$

$$\mathcal{L}_{gt} = \frac{1}{N} \|D_n - \hat{D}_n\|_2 \quad (8)$$

$$\mathcal{L} = \mathcal{L}_{smooth} + \mathcal{L}_{gt} \quad (9)$$

In formula (7). N represents the number of image pixels, $\partial d$ represents the gradient of the disparity map, and $\partial \varepsilon$ represents the gradient of an edge map of the original image. In formula (8), $\hat{D}_n$ represents the disparity label with the corresponding resolution, and $\|\bullet\|_2$ represents the L2 distance; and the final loss function is formed by adding two loss functions.

The invention claimed is:

1. A disparity estimation optimization method based on upsampling and exact rematching, comprising the following steps:
   step 1: extracting discriminable features;
   step 2: conducting initial cost matching and cost map optimization to obtain an initial disparity map with low resolution;

step 3: obtaining a disparity map with one resolution higher from the initial disparity map with low resolution by a propagation upsampling method and an exact rematching method, and repeating the process until the original resolution is restored;

3.1 the propagation upsampling method the initial disparity map $D_{n+1}$ with minimum resolution is first subjected to interpolation and upsampling to obtain a coarsely matched disparity map $D'_n$, the disparity map obtained at this moment is only obtained by numerical interpolation without reference to any structural information of an original image, a left view is reestablished with an original right view $I_r$ according to the coarsely matched disparity map $D'_n$ and denoted as $\tilde{I}_l$, and then the error between the reestablished left view $\tilde{I}_l$ and a real left view $I_l$ is calculated to obtain a confidence map $M_c$:

$$M_c = 1 - \text{normalization}(I_l - \tilde{I}_l) \quad (2)$$

normalization(•) is normalized operation, the difference is normalized to (0,1), and the probability value at each point on the confidence map $M_c$ represents the confidence of the disparity value of the pixel; and the confidence map is reproduced and translated to become a confidence map group which is denoted as $M_{cg}$, $$M_{cg} = f_c(M_c, k, s) \quad (3)$$

wherein $f_c(•)$ represents the operation of reproduction and translation to resize, k represents the size of a neighboring window, and s represents the void content of a sampling window; and the receptive field is $(2s+1)^2$, and a confidence vector of k*k is obtained at each position, which represents the confidence of a pixel in a k*k neighboring window around the pixel;

a relative relation network module is proposed, a left feature map with the corresponding resolution is input into the module, and a weight vector is worked out at each position, which indicates the relative relation of the neighboring pixel and the center pixel, i.e., the larger the weight is, the greater the effect of a neighboring pixel on the pixel is; and the weight is donated as $W_{relative}$;

$$W_{relative} = \vartheta_{relative}(F_n^l, k) \quad (4)$$

wherein k represents the size of a neighboring window, and $\vartheta_{relative}$ represents the relative relation network module;

the coarsely matched disparity map $D'_n$, the confidence map $M_{cg}$ and the relative relation weight $W_{relative}$ are used for propagation to obtain a propagated disparity map, and the propagation calculation process is as follows:

$$D_n^P = \langle f_c(D'_n, k, s), \text{softmax}(W_{relative} * M_{cg}) \rangle \quad (5)$$

wherein $D_n^P$ represents the propagated disparity map, $\langle, \rangle$ represents dot product operation, $f_c(•)$ represents the operation of reproduction and translation to resize, and softmax($W_{relative} * M_{cg}$) represents the support strength of the surrounding pixel to the center pixel during propagation and is obtained by multiplying the confidence of the surrounding pixel and the relative relation weight;

then the void content of the window is used for repeating the propagation process so that the optimized disparity map can be propagated in different receptive fields; and at this point, the propagation upsampling process from $D_{n+1}$ to $D_n^P$ is completed;

3.2 the exact rematching method first, a left feature map is reestablished with a right feature map $F_n^r$ with the corresponding resolution in a feature list $\mathcal{L}$ according to $D_n^P$ and donated as $\widetilde{F_n^l}$, and $\widetilde{F_n^l} = f_w(F_n^r, D_n^P)$; and rematching is conducted once with the reestablished left feature map $\widetilde{F_n^l}$ and the original left feature map $F_n^l$ within a small range of the disparity $d = [-d_0, d_0]$ to obtain a cost map, then the cost map is optimized through an hourglass network, the disparity is regressed to obtain a bias map $\Delta$ which represents an offset from $D_n^P$, and the two maps are added to obtain a final disparity map $D_n$ of an optimized network;

$$D_n = D_n^P + \Delta \quad (6)$$

the processes of 3.1 and 3.2 are iterated repeatedly until the original resolution is restored to obtain a final high-precision disparity map.

2. The disparity estimation optimization method based on upsampling and exact rematching according to claim 1, wherein in step 1, the features of the left and right views input into the network are extracted, feature maps with different resolutions are stored in the feature list $\mathcal{L}$, and then matching is conducted on the feature map with minimum resolution.

3. The disparity estimation optimization method based on upsampling and exact rematching according to claim 1, wherein in step 2, the left and right feature maps with minimum resolution are used, f'(x, y) f'(x, y) represents the feature vector at one point on the image, C represents a cost map, and the formula for forming the cost map is as follows:

$$C(x, y, d) = \langle f'(x, y) - f'(x-d, y) \rangle \quad (1)$$

$\langle \rangle$ represents the subtraction of the corresponding position elements of the feature vector, d is equal to $\{0, 1, 2, \ldots D_{max}\}$, and $D_{max}$ is the maximum disparity during matching; a cost map with minimum resolution is obtained and then optimized through an hourglass network; and the hourglass network is composed of convolution layers with different step sizes, and a cost map output from the hourglass network is regressed by the soft argmin layer to obtain an original disparity map with minimum resolution, which is donated as $D_{n+1}$.

* * * * *